Patented Nov. 2, 1937

2,097,915

UNITED STATES PATENT OFFICE 2,097,915

ICE COLOR INTERMEDIATES

Miles Augustinus Dahlen, Wilmington, Del., and Martin Edwin Friedrich, Carneys Point, N. J., assignors to E. I. du Pont de Nemours & Company, Wilmington, Del., a corporation of Delaware No Drawing. Application December 17, 1935, Serial No. 54,850

4 Claims. (Cl. 260—124)

This invention relates to new compounds and to processes of making them. More particularly the invention relates to new arylamides of 2,3-hydroxy-naphthoic acid which are represented by the formula:

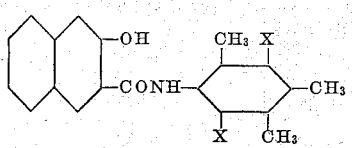

in which X represents hydrogen, halogen, or alkyl. These new compounds are useful as dye intermediates, but that particular utility does not limit their application to other purposes.

It is an object of the invention to prepare new arylamides of 2,3-hydroxy-naphthoic acid by processes which are technically and economically satisfactory. Other objects of the invention will be in part apparent and in part hereinafter set forth.

The objects of the invention are accomplished, generally speaking, by preparing the arylamide of 2,3-hydroxy-naphthoic-acid as represented by the formula:

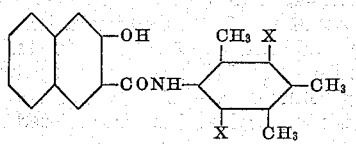

in which X represents hydrogen, halogen, or alkyl, by reacting an amine of the formula:

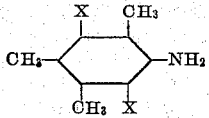

in which X is hydrogen, halogen, or alkyl, with 2,3-hydroxy-naphthoic-acid or one of its more reactive equivalents, such as 2,3-hydroxynaphthoyl-chloride.

In the preferred form of the invention 2,3-hydroxy-naphthoyl-chloride is used as the reagent. This material may be prepared by any suitable process, for instance by the action of thionyl-chloride, phosphorus-trichloride, phosphorus-penta-chloride, or any other reagent for the conversion of the carboxylic acids to their halides, upon solid 2,3-hydroxy-naphthoic acid or a dry metal salt thereof, or preferably by reacting 2,3-hydroxy-naphthoic-acid while suspended in an inert solvent, such as toluene, with thionyl-chloride or a similar reagent.

The reaction of 2,3-hydroxy-naphthoyl-chloride, or its equivalent, with the arylamine whose formula has been described is preferably effected in an inert solvent, such as toluene, chloro-benzene, nitro-benzene, or the like at elevated temperature, but it can be effected by suspending the arylamine in water in the presence of an acid-binding agent such as sodium acetate, sodium carbonate, potassium-bicarbonate or the like and treating it with 2,3-hydroxy-naphthoyl-chloride, the acid halide being added as a solid or in solution in a solvent, such as toluene, chloro-benzene, or carbon-tetrachloride.

When condensation to the new arylamide is complete, the solvent may be separated by steam distillation if the reaction has taken place in solution and the product will remain suspended in the aqueous residue from which it may be separated by filtration, and subjected to such purifying processes as are desirable. In many instances the new arylamide is quite insoluble in the reaction medium, particularly at temperatures from 0° to 35° C., so that a simple cooling of the reaction mixture separates the compound as a solid which may be removed by filtration.

Another method of preparing the arylamide involves reacting approximately equal quantities of 2,3-hydroxy-naphthoic-acid and of the arylamine while suspended in an inert solvent, such as toluene, chloro-benzent, xylene, or tetrachlor-ethane, and stirring until salt formation takes place. The suspension or solution of the salt, when treated with a dehydrating agent, such as phosphorus-trichloride or thionyl-chloride, dehydrates the salt and produces the new arylamine. This reaction is represented by the equations:

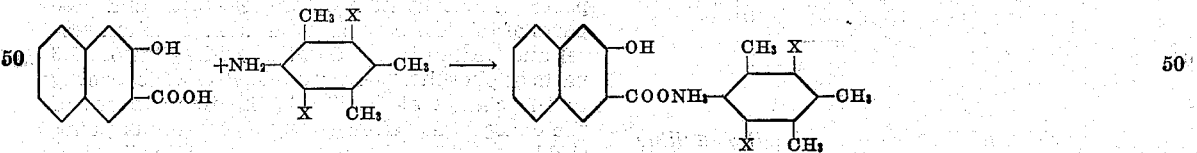

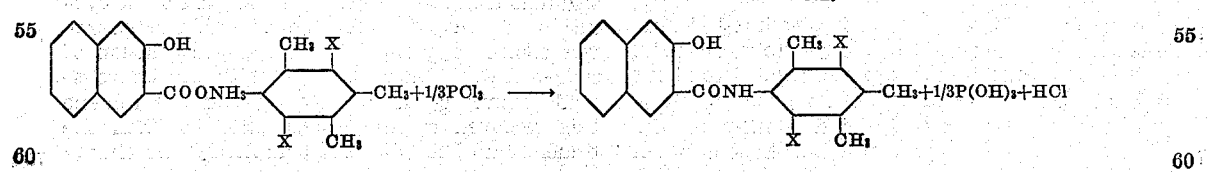

When thionyl-chloride is used as the dehydrating agent, the reaction is represented by the equation:

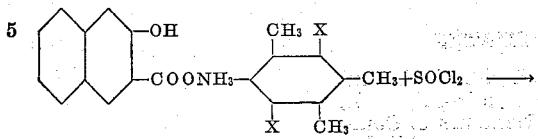

It is usually advantageous to effect the dehydration at elevated temperature, usually between 50° and 150° C. After dehydration an acid binding agent, such as sodium bicarbonate or sodium-carbonate, is added to neutralize any acidity in the bath. The solvent may be removed by steam distillation, in which case the arylamine remains suspended in the aqueous residue from the distillation. It can be separated by filtration and purified in any suitable manner, for instance by solution in, and crystallization from, a solvent. Alternatively the neutralized reaction mass may be cooled, and in most cases the arylamide will separate as a crystalline solid which may be removed by filtration.

The other halides may be substituted for the chlorides in the reactions herein discussed. Generally speaking, the chlorides and bromides are to be preferred to the other halides for reasons of economy and functional desirability.

The following examples, in which parts are stated by weight, illustrate but do not limit the invention.

Example I

*2,3-hydroxy-naphthoyl-6-bromo-2,4,5-trimethyl-aniline*

A mixture of 21.4 parts of 6-bromo-2,4,5-trimethyl-aniline, 18.8 parts of 2,3-hydroxy-naphthoic-acid, and 175 parts of toluene were warmed to about 50° C. with vigorous agitation, 6.0 parts of phosphorus-trichloride were added slowly to the charge while keeping the temperature between 50–60° C., the mass was warmed slowly to the reflux point, and was held there for about 18 hours. When the evolution of the hydrochloric-acid ceased the charge was cooled to about 80° C., a dilute solution of soda-ash was added (to neutralize the phosphorous-acid remaining in the charge), and the toluene was removed by steam distillation. When the toluene had been completely removed, the charge was cooled, and the precipitated arylamide was filtered, washed with water, and dried.

Part of the product was purified by dissolving in caustic soda solution, adding decolorizing charcoal, filtering, and reprecipitating by acidification (with hydrochloric-acid). The material is represented by the formula:

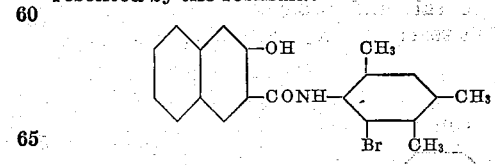

Example II

*2,3-hydroxy-naphthoyl-2,4,5-trimethyl-aniline*

A mixture of 14.1 parts of 2,4,5-trimethyl-aniline, 18.8 parts of 2,3-hydroxy-naphthoic-acid, and 100.0 parts of toluene were warmed to about 50° C. with vigorous agitation, 6 parts of phosphorus-trichloride were added slowly to the charge while the temperature was kept between 50–60° C., the mass was warmed slowly to the reflux point, and held there for 18 hours. When the evolution of hydrochloric-acid ceased, the charge was cooled to about 80° C., a dilute solution of soda-ash was added (to neutralize the phosphorous-acid remaining in the charge), and the toluene was removed by steam distillation. After the toluene had been removed completely, the charge was cooled, and the precipitated arylamide was filtered off, washed with water, and dried.

The product was purified by dissolving in caustic soda solution, adding decolorizing charcoal, filtering, and reprecipitating by the addition of hydrochloric-acid. The material is represented by the formula:

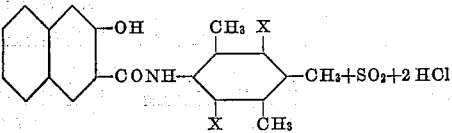

Example III

*2,3-hydroxy-naphthoyl-2,3,4,6-tetra-methyl-aniline*

A mixture of 15 parts of 2,3,4,6-tetra-methyl-aniline, 19 parts of 2,3-hydroxy-naphthoic-acid and 430 parts of toluene were warmed to about 50° C. with good agitation, 6.45 parts of phosphorus-trichloride were added slowly to the charge while keeping the temperature between 50–60° C., the mass was warmed slowly to the reflux point, and held there until the evolution of hydrochloric-acid ceased. The charge was cooled to about 80° C., a dilute solution of soda-ash was added, and the toluene was removed by steam distillation. When the toluene had been completely removed, the charge was cooled, and the precipitated aryl-amide was filtered, washed with water, and dried.

Part of the product was purified by dissolving in caustic solution, adding decolorizing charcoal, filtering, and reprecipitating by acidification with hydrochloric-acid. The material is represented by the formula:

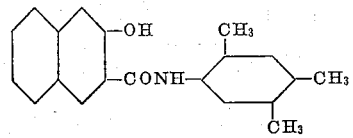

Example IV

*2,3-hydroxy-naphthoyl-penta-methyl-aniline*

A mixture of 3 parts of penta-methyl-aniline, 4 parts of 2,3-hydroxy-naphthoic-acid and 100 parts of toluene were charged into a reaction vessel and heated to 50° C. with good agitation, 1.6 parts of phosphorus-trichloride were added slowly to the charge at 50–60° C., the temperature of the charge was raised slowly to the reflux point, and held there for about 18 hours. After the evolution of hydrogen-chloride ceased, the charge was cooled to about 80° C. A dilute solution of soda-ash was added to neutralize the phosphorous-acid remaining in the charge, and the toluene was removed by steam distillation. When the toluene had been distilled completely, the charge was cooled, and the precipitated arylamide was filtered, washed with water, and dried.

Part of the product was purified by dissolving in caustic soda solution, clarifying with decolorizing charcoal, and reprecipitating with hydrochloric-acid. The material is represented by the formula:

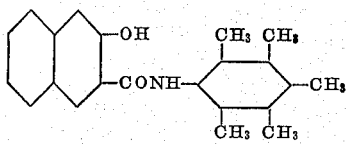

The processes illustrated hereinabove may be widely modified without departing from the spirit of the invention. For instance, the quantity of solvent and diluent used in any given reaction may be varied within wide limits; numerous reaction media are suitable for the condensation reactions when the dehydration method is used, the range of which is limited only by the necessity that the medium shall be non-reactive toward the ingredients of the mixture; the manner of isolating and purifying new arylamides may be varied to suit the conditions of the individual case, it being understood that different methods will be applied to individual products with respect to the degree of purity desired.

Among the arylamines which are suitable for the preparation of the new arylamides are the following:

6-chloro-2,4,5-trimethyl-aniline
6-fluoro-2,4,5-trimethyl-aniline
3-chloro-2,4,5-trimethyl-aniline
3-bromo-2,4,5-trimethyl-aniline
6-ethyl-2,4,5-trimethyl-aniline
3-ethyl-2,4,5-trimethyl-aniline.

As many apparently widely different embodiments of this invention may be made without departing from the spirit and scope thereof, it is to be understood that we do not limit ourselves to the specific embodiments thereof except as defined in the appended claims.

We claim:

1. A compound represented by the formula:

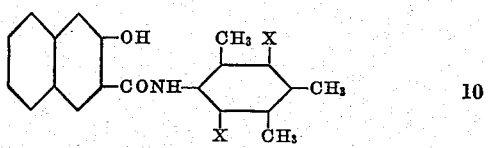

in which X is one of the group consisting of hydrogen, halogen, and methyl.

2. A compound represented by the formula:

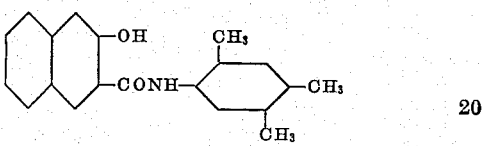

3. The compound represented by the formula

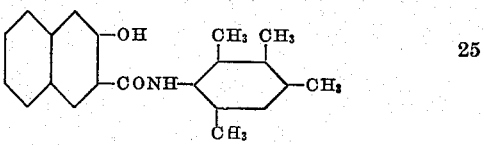

4. The compound represented by the formula

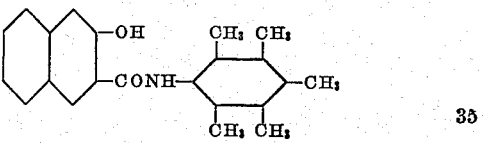

MILES AUGUSTINUS DAHLEN.
MARTIN EDWIN FRIEDRICH.